United States Patent [19]
Zeldman

[11] 3,838,897
[45] Oct. 1, 1974

[54] CURVILINEAR BEARING ASSEMBLY

[75] Inventor: Maurice I. Zeldman, Pittsburgh, Pa.

[73] Assignee: Rockwell International Corporation, Pittsburgh, Pa.

[22] Filed: Mar. 22, 1973

[21] Appl. No.: 343,872

[52] U.S. Cl. ............................................. 308/6 C
[51] Int. Cl. ............................................. F16c 29/06
[58] Field of Search ............ 308/6 R, 6 C, 2 R, 4 C

[56] References Cited
UNITED STATES PATENTS

| 2,520,785 | 8/1950 | Schlicksupp | 308/6 C |
| 2,681,836 | 6/1954 | Jarund | 308/6 C |
| 3,582,157 | 6/1971 | Hammon | 308/4 C |

FOREIGN PATENTS OR APPLICATIONS
630,650  7/1963  Belgium ............................. 308/6 C Primary Examiner—Manuel A. Antonakas

[57] ABSTRACT

An anti-friction ball bearing assembly adapted for mounting on a shaft comprising an outer sleeve and an inner sleeve, the inner surface of said inner sleeve being curvilinear and defining a passage therethrough for said shaft. A plurality of balls circulate between said sleeves and said shaft.

10 Claims, 2 Drawing Figures

CURVILINEAR BEARING ASSEMBLY

BACKGROUND OF THE INVENTION

This invention relates generally to bearing assemblies and in particular, to a anti-friction ball bearing assembly adapted for mounting on a shaft comprising an outer sleeve and an inner sleeve concentrically fitting within said outer sleeve, the inner sleeve having a plurality of tracks defining paths for the circulation of balls between said sleeves and said shaft during movement between said shaft and said bearing assembly, the inner surface of said inner sleeve being curvilinear and defining a passage therethrough for said shaft.

The prior art is replete with different forms of "linear" type bearings. Examples of such prior art forms are: U.S. Pat. No. 2,451,359 to T. F. Schlicksupp, U.S. Pat. No. 2,628,135 to R. C. Magee and U.S. Pat. No. 3,357,754 to C. Betrix. It may be generally said of the prior art that they seek to carefully maintain the alignment between the shaft and bearing assembly. That is, the prior art forms of linear bearing are designed, as the name implies, for accommodating linear movement only.

There are many applications where bearing support is needed for mechanical movements where other than true linear movement is involved.

Applications for such non-linear mechanical movements may be found in all types of apparatus such as knitting machines, copying machines and agricultural equipment and the like. Obviously the prior art forms of linear bearings are totally unsuited to this particular task.

SUMMARY OF THE INVENTION

Accordingly it is a primary object to provide an anti-friction ball bearing assembly adapted for mounting on a shaft comprising an outer sleeve and an inner sleeve concentrically fitting within said outer sleeve, the inner sleeve having a plurality of tracks defining paths for the circulation of balls between said sleeves and said shaft during movement between said shaft and said bearing assembly, the inner surface of said inner sleeve being curvilinear and defining a passage therethrough for said shaft.

It is another important object of the present invention to provide an anti-friction ball bearing assembly in which the curvilinear inner surface is circular in cross section.

It is yet another object of the present invention to provide an anti-friction ball bearing assembly in which the curvilinear inner surface has a maximum cross section at each end thereof.

It is still another important object of the present invention to provide an anti-friction ball bearing assembly in which the curvilinear inner surface has a minimum cross section midway between the ends of the inner sleeve.

It is still another object of the present invention to provide an anti-friction ball bearing assembly in which the shaft is circular in cross section.

It is yet another object of the present invention to provide an anti-friction ball bearing assembly in which the shaft is uniform in cross section.

It is still another object of the present invention to provide an anti-friction ball bearing assembly in which the tracks of balls are disposed in line with the longitudinal axis of said passage.

It is another object of the present invention to provide an anti-friction ball bearing assembly in which the tracks of balls are angularly disposed to the longitudinal axis of said passage.

It is still another object of the present invention to provide an anti-friction ball bearing assembly in which the shaft is coated with a selflubricating plastic material.

It is another object of the present invention to provide an anti-friction ball bearing assembly in which the shaft is coated with polytetrafloroethylene.

It is another object of the present invention to provide a highly efficient ball bearing assembly capable of being inexpensively manufactured and being simplistic in design.

Another object of the present invention is to provide an improved anti-friction ball bearing assembly having superior load carrying characteristics.

It is still another object of the present invention to provide an improved anti-friction ball bearing assembly which can be manufactured using automated high volume techniques.

Another important object of the present invention is to provide an anti-friction ball bearing assembly capable of accommodating multi-directional movements of the shaft with respect to the bearing assembly.

Other objects and advantages of the invention will become apparent as the present invention is better understood from the following disclosure and as shown in the accompanying drawings.

DESCRIPTION OF THE DRAWINGS

The accompanying drawings, referred herein and constituting a part hereof, illustrate an embodiment of the invention, and together with the description, serve to explain the principles of the invention.

In the drawings.

DESCRIPTION OF THE INVENTION

Figure 1:
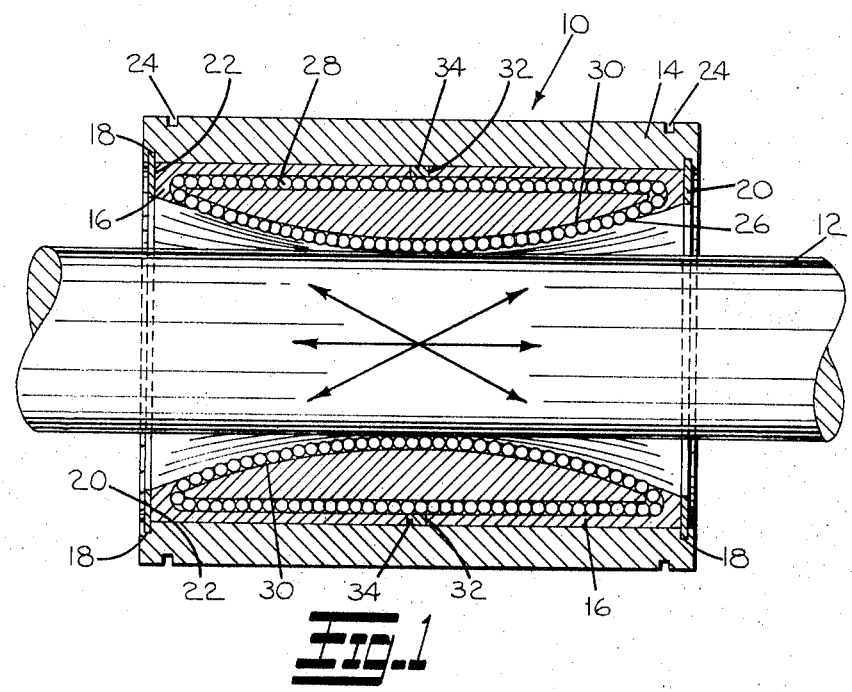
FIG. 1 is a side elevational view partially in section of a anti-friction ball bearing assembly in accordance with the present invention mounted on a circular shaft.
Figure 2:
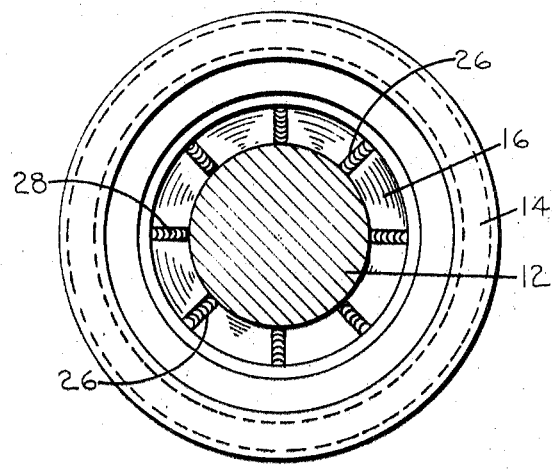
FIG. 2 is end view of the improved anti-friction ball bearing assembly of FIG. 1.

Referring now to FIG. 1 and FIG. 2, there is therein shown an improved anti-friction ball bearing assembly 10 in accordance with the present invention. It should be obvious to one having ordinary skill in this art that the ball bearing assembly 10 is highly adaptable of accommodating multi-directional movements of the shaft 12 and/or vice versa.

The improved anti-friction ball bearing assembly 10 is provided with an outer sleeve 14 and an inner sleeve 16.

The inner sleeve 16 is concentrically interfitted within the outer sleeve 14. The outer surface of the inner sleeve 16 may be so shaped (e.g. polyhedronal in shape) and may be provided with a number of axially extending planar-like surfaces (not shown). The inner surface of the outer sleeve 14 may also be provided with axially extending planar-like surfaces generally corresponding to the planar-like surfaces on the outer surface. These respective planar-like surfaces provide the mechanical interlocking relationship between the inner sleeve 16 and outer sleeve 14. This mechanical interlocking relationship may be described as an anti-rotational relationship. The axial positional integrity of the inner sleeve 16 with respect to the outer sleeve 14 is accomplished by the provision of annular grooves 18 on the inner surface of the outer sleeve 14 at each end thereof. Annular snap rings 20 or other suitable holding means are disposed in said annular grooves 18 abutting radial ending end portions 22 of the sleeve.

The outer surface of the outer sleeve 14 may be a cylindrical body of revolution with two annular grooves 24 provided therein at each end thereof. These annular grooves 24 may be used to positionally attach the anti-friction ball bearing assembly 10 to an appropriate machine element or the like (not shown).

The inner sleeve 16 is further provided with a number of tracks 26 which define a plurality of paths for the circulation of load carrying balls. A portion of the defined path of the circulation balls may be described as an "active" portion and part of the path may be described as a "passive" portion. The active circulation path is that portion of the path when the balls 28 are in contact or may be in contact with the shaft 12. It should be noted that the shaft will be operationally supported by different groupings of load carrying balls 28 depending upon the relative position of the shaft 12 relative to the inner surface of the inner sleeve 16. This, of course, is the major thrust of the present invention in that ball bearing assembly 10 is uniquely capable of accommodating both rocking and rolling motion of the shaft 12 and/or vice-versa as can be seen from FIGS. 1 and 2, the active portion of the circulation path of the balls is angularly disposed with respect to the shaft.

The passive circulation path of the circulating balls 28 is that portion of the path when the balls 28 are out of actual or potential operational contact with the shaft 12.

Accordingly, it can be seen from the above description the balls 28 circulate as a group of them contact the shaft 12 and there is, additionally, relative movement therebetween. This affords anti-friction operational support of the shaft 12.

During the active portion of the circulation of the balls 28, the balls are held in operational position by the caging effect of the inner sleeve 16. That is, only a portion of the balls 28 are allowed to protrude through the tracks providing a clearance between the shaft 12 and the inner surface of the inner sleeve 16.

The inner sleeve provides a bearing surface 30 for the balls 28 as they traverse the active position. The bearing surface 30 could, of course, be specially treated with a self-lubricating plastic material such as polytetrafluoroethylene and the inner sleeve 16 could be made in segments (not shown) to facilitate the machining of its various parts. Additionally, the tracks could be placed in line with the passageway defined by the inner surface of the inner sleeve 16 or angularly disposed thereto. In the latter case the inner surface of the outer sleeve 14 could be so formed as to provide a bearing surface for the balls 28 while they are in the active state.

Assembly and machining of the ball bearing assembly 10 can be achieved using advanced high volume automated techniques. In particular, the design of the outer sleeve 14 renders it particularly adaptable to broaching. The inner surface of the outer sleeve 14 comprising both the axially extending planar surfaces and the raceways 24 could be broached by utilizing a pull or push broach. Preferably, a pull broach would be utilized for such a broach would be less apt to bind during the cutting operation of the inner surface. Other suitable machining and/or molding operations could likewise be utilized to manufacture and fabricate the inner sleeve.

Assembly of the overall anti-friction ball bearing assembly 10 in a like manner could be accomplished by using advance automated techniques.

The step of loading the balls 28 in their respective tracks 26 could be facilitated by the provision of annular groove 32 on the outer surface of the inner sleeve 16. The annular groove being in communication with each of the tracks 26. After the balls 28 are loaded in each of their tracks 26 a resilient ring 34 could be placed in the annular groove 32 to prevent any inadvertent escape of the balls 28.

The various components of the anti-friction ball bearing assembly 10 could be manufactured from a wide range of materials utilizing a number of fully automated techniques.

Obviously, the present invention is not limited to the specific details as herein described, but is capable of other modifications and changes without departing from the spirit and scope of the appended claims.

I claim:

1. An anti-friction ball bearing assembly adapted for mounting on a shaft comprising in consideration with a shaft an outer sleeve and an inner sleeve concentrically fitting within said outer sleeve, a plurality of balls interposed between said sleeves and said shaft, the inner sleeve having a plurality of tracks defining paths for the circulation of balls between said sleeves and said shaft during movement between said shaft and said bearing assembly, the inner surface of said inner sleeve being curvilinear and defining a passage therethrough for said shaft.

2. An anti-friction ball bearing assembly in accordance with claim 1 wherein said curvilinear inner surface is circular in cross section.

3. An anti-friction ball bearing assembly in accordance with claim 2 wherein said curvilinear inner surface has a maximum cross section at each end thereof.

4. An anti-friction ball bearing assembly in accordance with claim 3 wherein said curvilinear inner surface has a minimum cross section midway between the ends of said inner sleeve.

5. An anti-friction ball bearing assembly in accordance with claim 4 wherein said shaft is circular in cross section.

6. An anti-friction ball bearing assembly in accordance with claim 5 wherein said shaft is uniform in cross section.

7. An anti-friction ball bearing assembly in accordance with claim 6 wherein said shaft is coated with a self-lubricating plastic material.

8. An anti-friction ball bearing assembly in accordance with claim 7 wherein said shaft is coated with polytetrafloroethylene.

9. An anti-friction ball bearing assembly in accordance with claim 1 wherein said tracks of balls are disposed in line with the longitudinal axis of said passage.

10. An anti-friction ball bearing assembly in accordance with claim 1 wherein said tracks of balls are angularly disposed to the longitudinal axis of said passage.

* * * * *